United States Patent
Rothmund et al.

(10) Patent No.: US 10,641,349 B2
(45) Date of Patent: May 5, 2020

(54) CONTROL OF A CHANGE-GEAR TRANSMISSION

(71) Applicant: GM GLOBAL TECHNOLOGY OPERATIONS LLC, Detroit, MI (US)

(72) Inventors: Hermann Rothmund, Wiesbaden (DE); Boris Schilder, Frankfurt am Main (DE); David Eggert, Ober-Olm (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 15/963,177

(22) Filed: Apr. 26, 2018

(65) Prior Publication Data
US 2018/0313415 A1     Nov. 1, 2018

(30) Foreign Application Priority Data
Apr. 26, 2017   (DE) .......................... 10 2017 004 048

(51) Int. Cl.
*F16D 48/06*     (2006.01)
*F16H 61/02*     (2006.01)
(Continued)

(52) U.S. Cl.
CPC ....... *F16D 48/068* (2013.01); *F16H 61/0248* (2013.01); *F16H 63/42* (2013.01);
(Continued)

(58) Field of Classification Search
CPC ............... F16D 48/068; F16H 61/0248; B60Y 2300/1803; B60Y 2400/71; B60Y 2500/10412; B60Y 2500/1045; B60Y 2500/30806; B60Y 2500/3108; B60Y 2500/3144; B60Y 2500/31466; B60Y 2500/5085; B60Y 59/044; B60Y 2063/426; Y02T 10/76; B60W 10/02; B60W 30/19; B60W 30/182
See application file for complete search history.

(56) References Cited

U.S. PATENT DOCUMENTS

| 4,295,551 A * | 10/1981 | Zimmermann ... B60W 30/1819 192/3.58 |
| 5,089,965 A * | 2/1992 | Braun ................. F16H 61/0248 477/125 |

(Continued)

FOREIGN PATENT DOCUMENTS

DE   102009045091 A1   3/2011

*Primary Examiner* — Tinh Dang
(74) *Attorney, Agent, or Firm* — Lorenz & Kopf LLP

(57) ABSTRACT

A change-gear transmission system includes a transmission that can be switched between multiple gears, a gearshift lever for selecting between the gears of the transmission, an automatically actuatable clutch, which is arranged in a drive train in series with the transmission and a control unit for automatically opening the clutch while maintaining a gear engaged in the transmission when a condition for the transition into coasting or gliding mode is fulfilled. The control unit is configured to detect a touch of the gearshift lever by the driver, to open the clutch only when no touch of the gearshift lever is detected, and further in the case that in the coasting or gliding mode, a touch of the gearshift lever is detected, to close the clutch while maintaining the engaged gear.

15 Claims, 1 Drawing Sheet

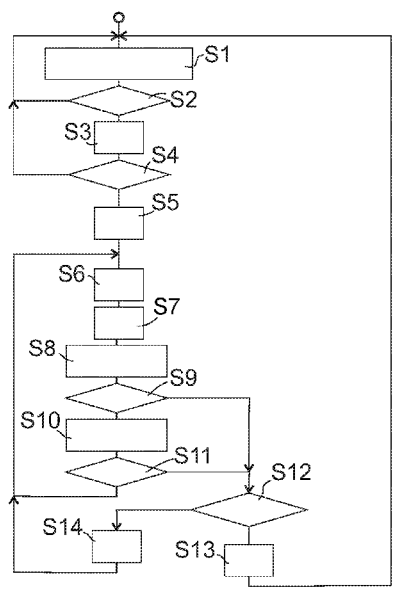

(51) Int. Cl.

| | |
|---|---|
| *F16H 63/42* | (2006.01) |
| *F16H 63/46* | (2006.01) |
| *F16H 59/04* | (2006.01) |
| *B60W 30/19* | (2012.01) |
| *B60W 30/182* | (2020.01) |
| *B60W 10/02* | (2006.01) |

(52) U.S. Cl.
CPC .... *F16H 63/46* (2013.01); *B60Y 2300/18083* (2013.01); *B60Y 2400/71* (2013.01); *F16D 2500/1045* (2013.01); *F16D 2500/10412* (2013.01); *F16D 2500/30806* (2013.01); *F16D 2500/3108* (2013.01); *F16D 2500/3144* (2013.01); *F16D 2500/31466* (2013.01); *F16D 2500/5085* (2013.01); *F16H 59/044* (2013.01); *F16H 2063/426* (2013.01); *Y02T 10/76* (2013.01)

(56) References Cited

U.S. PATENT DOCUMENTS

| | | | |
|---|---|---|---|
| 5,489,247 A * | 2/1996 | Markyvech | F16H 61/0403 477/120 |
| 8,527,164 B2 * | 9/2013 | Staudinger | B60W 10/02 477/81 |
| 9,656,671 B2 * | 5/2017 | Martin | B60W 10/02 |
| 2012/0245810 A1 | 9/2012 | Staudinger et al. | |

\* cited by examiner

Fig. 1

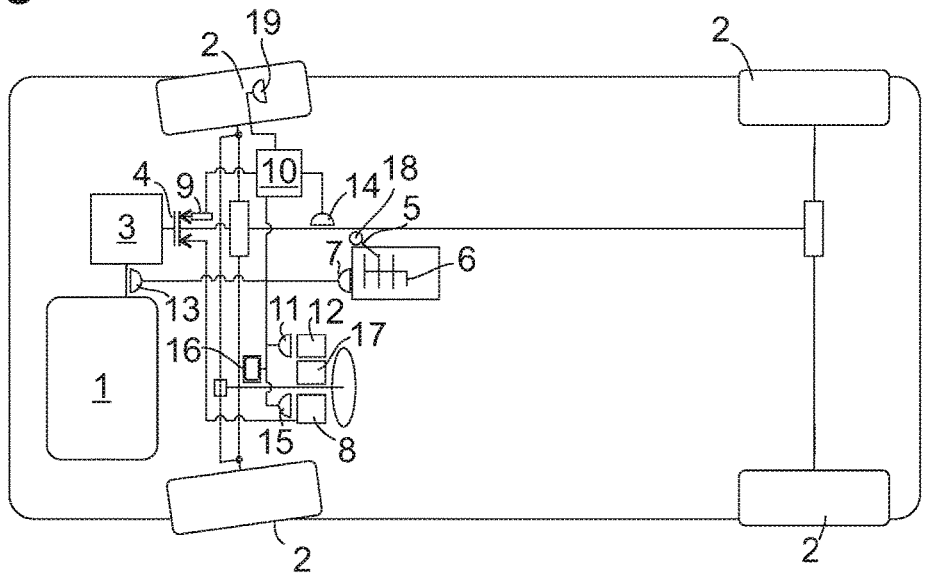

Fig. 2

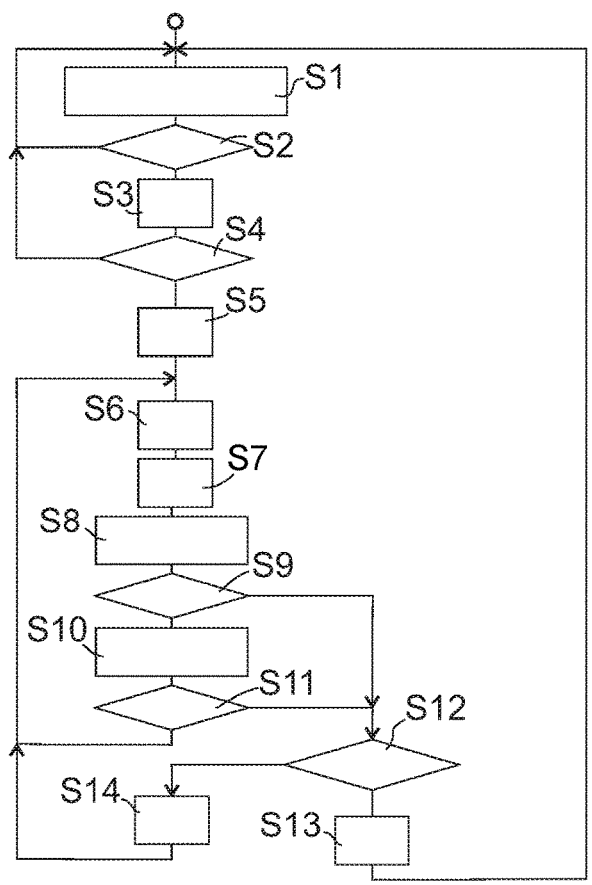

Reference Numbers for
FIG. 2 (060.3849)
S1: Monitor Positions
S2: Accelerator Pedal Released Without Clutch?
S3: Query Position Sensor
S4: Change in Position?
S5: Open Clutch
S6: Monitor Speedometer
S7: Close Clutch
S8: Query Brake and Position Sensors
S9: Actuation of the Brake Pedal?
S10: Query Proximity Sensor
S11: Driver Touching Gearshift Lever?
S12: Determined and Engaged Gears Correspond?
S13:: Switch Engine On
S14: Address Display Instrument

CONTROL OF A CHANGE-GEAR TRANSMISSION

CROSS-REFERENCE TO RELATED APPLICATION

This application claims priority to German Patent Application No. 102017004048.6, filed Apr. 26, 2017, which is incorporated herein by reference in its entirety.

TECHNICAL FIELD

The present disclosure pertains to a change-gear transmission system for a vehicle which supports automatic switching into a coasting or gliding mode, and to a method for controlling a clutch in a change-gear transmission system.

BACKGROUND

A conventional change-gear transmission system is described in US 2012/0245810 claiming priority to DE 10 2009 045 091 A1. In the coasting mode, the torque transmission in the drive train from the engine to the running gear is interrupted by opening a clutch. In the gliding mode, the engine is additionally switched off. When the driver of a vehicle takes his or her foot off the accelerator pedal, an automatic switching of the transmission system into one of these modes makes possible an energy-saving locomotion, with which the vehicle is not decelerated by the drag moment of the engine.

Currently, such an automatic switching is only supported in conjunction with automatic transmissions or automated change-gear transmissions since the speed of the vehicle can change during the coasting or gliding mode and for leaving the coasting or gliding mode, it can therefore be necessary to adapt the gear engaged in the transmission. When leaving the coasting or gliding mode, a gear may be selected for a maximum acceleration, maximum engine braking effect or for low-consumption operation depending on the choice of the driver.

However, such a gear adaptation simultaneously delays the return into the normal driving mode. In particular, when driving in dense city traffic where traffic lights and vehicles driving ahead require frequent and rapid speed adaptations, such an automatic switching forces frequent use of the brake which may be perceived as annoying by drivers accustomed to using a manual change-gear transmission and utilizing the engine drag moment for decelerating the vehicle.

Accordingly, there is a need to provide a change-gear transmission system which on the one hand is able to utilize the fuel savings potential connected with automatic switching into the coasting or gliding mode, and on the other hand is able to make speed adaptations in city traffic without excessive use of the brake.

SUMMARY

According to a configuration of the present disclosure, a change-gear transmission system is provided for a vehicle with a transmission that can be changed over between multiple gears, a gear shift lever for selecting between the gears of the transmission, an automatically actuatable clutch, which is arranged in a drive train in series with the transmission, and a control unit, which automatically opens the clutch when a condition for the transition into coasting or gliding mode is fulfilled, is equipped to detect a touch of the gearshift lever by the driver and the condition for the switching includes the part condition that the gearshift lever is not touched.

Here it is utilized that an experienced driver, when he anticipates the need for decelerating the vehicle but cannot yet estimate whether the drag moment that is available in the current gear is adequate for the required deceleration, tends to put the hand on the gearshift lever even before he opens the clutch in order to be able to downshift quickly when required. When such a driver changes to a vehicle with the change-gear transmission system according to the present disclosure, he does not notice any change in the vehicle behavior in such a situation since no automatic clutch opening takes place and the expected drag deceleration occurs. In a situation in which there is no need for the speed correction via the drag moment, and the driver thus need not be ready for shifting either and can leave the hand off the gearshift lever, the clutch, by contrast, is opened automatically so that through the coasting or gliding mode an energy-saving locomotion is possible.

According to a second configuration of the present disclosure a change-gear transmission system is provided for a vehicle with a transmission that can be changed over between multiple gears, a gearshift lever for selecting between the gears of the transmission, an automatically actuatable clutch, which is arranged in a drive train in series with the transmission, and a control unit for automatically opening the clutch while maintaining a gear engaged in the transmission, when a condition for the transition into coasting or gliding mode is fulfilled. The control unit is equipped to detect a touch of the gearshift lever by the driver. In the case that in the coasting or gliding mode a touch of the gearshift lever is detected, the control unit is configured to close the clutch while maintaining the engaged gear. Accordingly, a transition into the coasting or gliding mode can take place initially and result in that a drag deceleration, to which the driver is accustomed from a conventional shift vehicle, does not occur. When this driver now touches the gearshift lever in order to increase the drag deceleration by downshifting in the customary manner, this also brings about the intended deceleration here.

Thus, the fuel saving connected with the automatic switching into coasting or gliding mode can be achieved with a change-gear transmission system which in its handling does not differ for the driver or hardly noticeably from a conventional manual shift transmission.

As a part condition for the transition into the coasting or gliding mode, it can be provided that an accelerator pedal is unactuated. In principle, a transition into the coasting or gliding mode can also be already permitted when the accelerator pedal is actuated but the extent of the actuation is so low that the torque supplied by the engine is not adequate for overcoming the drag moment, i.e. when torque is not transmitted from the engine to the running gear but conversely the running gear contributes to driving the engine.

Since the change-gear transmission system according to the present disclosure does not require that the gear engaged in the transmission can be changed without any action of the driver, a gearshift lever can be used which in a manner that is customary in manual shift transmissions can be moved between multiple shifting positions. Each gear of the transmission is assigned exactly one shifting position.

The drive train can include a clutch controlled by the driver in order to make it possible for the driver to handle the change-gear transmission system according to the present disclosure like a manual transmission system in the customary manner. The clutch is preferably identical to the above-mentioned clutch that is actuatable by the control unit.

Prior to closing the clutch, the control unit should be equipped for checking if the currently engaged gear is appropriate for the vehicle speed so as not to close the clutch with inappropriate gear. In this case it can be left to the driver to establish suitable conditions for closing the clutch, for example by braking the vehicle or engaging another gear. However, following the establishment of these conditions, the closing of the clutch should again take place automatically under the control of the control unit.

The control unit can support the driver in that it signals a gear that is appropriate for the vehicle speed. This may be done continuously regardless of the mode in which the vehicle happens to find itself, but should at least do this when it detects a touch of the gearshift lever.

For detecting the touch, the gearshift lever can be equipped with a proximity sensor operably connected to the control unit. However, the gearshift lever can also be equipped with a position sensor with the control unit connected to the position sensor in order to detect a touch of the gearshift lever by the driver by way of a change of the position of the gearshift lever.

According to a further configuration of the present disclosure a method is provided for controlling a clutch in a change-gear transmission system with a transmission that can be changed over between multiple gears, which is arranged in a drive train in series with the clutch, and a gearshift lever for selecting between the gears of the transmission. In the method, with the clutch closed, it is checked if as a first part condition opening the clutch is fulfilled and as a second part condition the gearshift lever is untouched, then the clutch is only opened when both part conditions are fulfilled. According to yet another configuration, with open clutch and gear engaged in the transmission, it is checked if the gearshift lever is touched, and in the case of a touch, the clutch can be closed maintaining the engaged gear. Both last-mentioned configurations can be realized in a uniform method process.

Practically, when a touch of the gearshift lever is detected with opened clutch, it should be checked if the engaged gear is appropriate for the vehicle speed, and the clutch is closed only if appropriate. At least in the case that the gear is not appropriate, a gear that is appropriate for the vehicle speed may be signaled or otherwise indicated to the driver.

Further subjects of the present disclosure include a computer program product with program code which enable a processor to operate as control unit in a change-gear transmission system as described above or carry the methods described above, a computer-readable data carrier on which program instructions are recorded which enable a computer to work in this manner as well as a control unit configured to check with closed clutch if a first part condition for an opening of the clutch is fulfilled, to check if as a second part condition the gearshift lever is untouched, to open the clutch only when both part conditions are fulfilled, and/or to check if the gearshift lever is touched with opened clutch, and to close the clutch while maintaining the engaged gear in the case of a touch.

BRIEF DESCRIPTION OF THE DRAWINGS

The present disclosure will hereinafter be described in conjunction with the following drawing figures, wherein like numerals denote like elements.

FIG. 1 shows a block diagram of a vehicle according to the present disclosure; and FIG. 2 shows a flow diagram of a working method carried out by a control unit of the vehicle.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows in a schematic top view a motor vehicle with an engine 1 and a drive train which connects the engine 1 with wheels 2 of a running gear and in which a transmission 3 and a clutch 4 based on the flow direction of the torque from the engine 1 to the running gear are arranged in series.

The transmission 3 is controlled with the aid of a gearshift lever 5 in a conventional manner, which can be moved in a shifting gate 6 between the positions assigned to the different gears of the transmission 3, which in each case are located at the ends of shifting slots of the shifting gate 6. The gearshift lever 5 can be coupled to an internal shifting of the transmission 3 mechanically, for example via cable pulls, so that each gear of the transmission corresponds exactly to one position of the gearshift lever 5.

On the shifting gate 6, a position sensor 7 for detecting the position of the gearshift lever 5, typically in the form of two angle sensors for detecting angles of the gearshift lever in the shifting degree of freedom or in the selecting degree of freedom, is provided. Complementarily, a proximity sensor 18 can be provided in a grip of the gearshift lever 5, which reacts to the handle being touched by the driver's hand.

The clutch 4, on the one hand, is controllable by the driver via a clutch pedal 8 and, on the other hand, by an electronic control unit 10 via an actuator 9.

The electronic control unit 10 is connected to a load sensor 11 which supplies a signal that is representative for the actual engine load or the engine load demanded by the driver. As shown in the figure, the load sensor 11 can be arranged on an accelerator pedal 12 in order to detect the extent of the actuation of the accelerator pedal 12 by the driver.

Furthermore, a rotational speed sensor 13 on an output shaft of the engine 1, a speedometer 14, a sensor 15 for detecting the actuation of the clutch pedal 8 and a display 16 arranged on the instrument panel of the vehicle are connected to the control unit 10.

FIG. 2 shows a working method of the control unit 10 in the form of a flow diagram. At S1, the control unit 10 continuously monitors the position of the accelerator pedal 12, of the clutch pedal 8 and of the gearshift lever 5 by way of the outputs of the sensors 11, 15 and 7. When it is then determined at S2 that the driver releases the accelerator pedal 12 without actuating the clutch pedal 8, the control unit 10 again queries the position sensor 7 at S3 and checks at S4 if the position of the gearshift lever 5 detected by position sensor 7 has change since S1. If yes, this indicates that the driver could have touched the gearshift lever 5 with the intention of shifting the transmission 3. In this case, nothing further happens and control returns to the monitoring of the sensors 11, 15, 7 at S1. If, by contrast, it is determined that the position of the gearshift lever 5 is unchanged, it is concluded that the gearshift lever 5 is not touched, the control unit 10 then opens the clutch 4 with the aid of the actuator 9 at S5.

If a proximity sensor 18 is present on the gearshift lever 5, the control unit 10 can also make the decision at S4 as to whether the gearshift lever 5 is touched or not with the aid of the proximity sensor 18. In this case, the monitoring of at S1 can be limited to accelerator pedal 12 and clutch pedal 16.

By opening the clutch 4, the vehicle enters a coasting mode or, if the engine 1 is additionally also switched off at S5 into the gliding mode. During the coasting or gliding mode, the control unit 10 monitors the speedometer 14 at S6 and determines a gear by way of the measured speed of the vehicle which should be engaged in the transmission 3 in the case that the clutch 4 has to be closed again at S7. If it is desired, the gear so determined can be displayed on the instrument panel 16. The determined gear can also be compared beforehand with the currently engaged gear, which the control unit 10 determines from the data of the position sensor 7, and the determined gear may be displayed only when it is distinct from the currently engaged gear. In other words, the manner in which the determined gear is displayed can be made dependent on whether it corresponds to the currently engaged gear or not. Regardless of which alternative is selected, the driver in each case can recognize by way of the instrument panel 16 if determined and engaged gear correspond.

The control unit 10, furthermore, queries the load sensor 11 and a brake pressure sensor 19 at S8 and the position sensor 7 or if applicable the proximity sensor 18 at S10. When the load sensor 11 indicates that the accelerator pedal 12 is again actuated or the brake pressure sensor 19 indicates an actuation of the brake pedal 17 at S9 or when the position sensor 7 or proximity sensor 18 indicates that the driver touches the gearshift lever 5 at S11, a check is made at S12 if the determined and engaged gear correspond. If this is the case, the control unit 10 closes the clutch 4 and, provided the same has been switched off previously, switches the engine on again at S13. Control then reverts to S1. If none of these conditions is fulfilled, the control then reverts to S6.

In the case of the non-correspondence at the latest, the control unit 10 addresses the display instrument 16 at S14 in order to point out to the driver that with the currently engaged gear the clutch 4 cannot be closed. The notification may include a display on the instrument panel 16 of the determined gear number. Alternately the notification may replace the engaged gear number with the determined gear number in a modified display format, for example flashing instead of continuous or in a different color. Additional notifications may include a display of the difference or direction of the determined gear number relative to the engaged gear number, for example in the form of plus or minus signs or directional arrows, such that the number of signs indicates the number of the gear stages to be upshifted or downshifted.

Whether the driver reacts to this display by shifting or by actuating the brake pedal is left to him. Meanwhile, the control circuit 10 continues monitoring at S6. As soon as this reveals upon a repetition at S12 that engaged and determined gear coincide, the processing branches to S13 in order to again leave the coasting or gliding mode.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

The invention claimed is:

1. A change-gear transmission system for a vehicle comprising:
    a transmission switchable between a plurality of gears;
    a gearshift lever for selectively engaging one of the plurality of gears;
    a clutch assembly arranged in a drive train in series with the transmission and operable to configure the drive train in a coasting mode;
    an actuator coupled to the clutch assembly and operable to open and close the clutch assemble; and
    a control unit configured to detect a touch of the gearshift lever and to determine a condition for transiting the drive train into the coasting mode, wherein the control unit operates the actuator to open the clutch assembly when the condition for transiting into the coasting mode is fulfilled and the gearshift lever is not touched.

2. The change-gear transmission system according to claim 1, wherein the drive train is in the coasting mode and the control unit is further configured to close the clutch assembly while maintaining an engaged gear when a touch of the gearshift lever is detected.

3. The change-gear transmission system according to claim 2, wherein the condition comprises an actuation condition of an accelerator pedal indicating that the accelerator pedal is unactuated or only slightly actuated so that the direction of torque transmission in the drive train is inverted.

4. The change-gear transmission system according to claim 2, wherein the gearshift lever is movable between a plurality of shifting positions, wherein each gear of the transmission is assigned exactly one shifting position.

5. The change-gear transmission system according to claim 2, wherein the control unit is configured to check if a currently engaged gear is appropriate for a vehicle speed prior to a closing of the clutch, and closing the clutch only when the currently engaged gear is appropriate for the vehicle speed.

6. The change-gear transmission system according to claim 5, wherein the control unit is configured to determine an appropriate gear for the vehicle speed and to indicate the appropriate gear.

7. The change-gear transmission system according to claim 2, further comprising a proximity sensor on the gearshift lever in data communication with the control unit for detecting the touch of the gearshift lever by the driver.

8. The change-gear transmission system according to claim 2, further comprising a position sensor for the gearshift lever in data communication with the control unit to detect a change of the position of the gearshift lever indicating the touch of the gearshift lever by the driver.

9. A method for controlling a change-gear transmission system having a transmission switchable between a plurality of gears, a gearshift lever for selectively engaging one of the plurality of gears, a clutch assembly arranged in a drive train in series with the transmission and operable to configure the drive train in a coasting mode, an actuator coupled to the clutch assembly and operable to open and close the clutch assemble, and a control unit configured to selectively control the actuator, the method comprising:
    determining when a first condition for opening the clutch assembly is fulfilled;

determining a second condition when the gearshift lever is untouched; and opening the clutch when the first and second conditions are fulfilled.

10. The method for controlling according to claim 9, wherein the drive train is in the coasting mode and the method further comprises closing the clutch assembly while maintaining an engaged gear when a touch of the gearshift lever is detected.

11. The method according to claim 10, further comprising:

determining when the engaged gear is appropriate for a vehicle speed; and closing the clutch assembly when the engaged gear is appropriate for the vehicle speed.

12. The method according to claim 11, further comprising:

determining an appropriate gear for the vehicle speed; and indicating the appropriate gear when the engaged gear is different than the appropriate gear.

13. A non-transitory computer readable medium comprising program instructions, which when executed on a computer enable the computer to:

determine when a first condition for opening the clutch assembly is fulfilled;

determine a second condition when the gearshift lever is untouched;

open the clutch when the first and second conditions are fulfilled;

close the clutch assembly while maintaining an engaged gear when a touch of the gearshift lever is detected, and the drive train is in the coasting mode.

14. The non-transitory computer readable medium according to claim 13, further comprising the program instructions, which when executed on the computer enable the computer to:

determine when the engaged gear is appropriate for a vehicle speed; and close the clutch assembly when the engaged gear is appropriate for the vehicle speed.

15. The non-transitory computer readable medium according to claim 13, further comprising the program instructions, which when executed on the computer enable the computer to:

determine an appropriate gear for the vehicle speed; and indicate the appropriate gear when the engaged gear is different than the appropriate gear.

* * * * *